US009606272B2

(12) United States Patent
Sandre-Chardonnal (10) Patent No.: US 9,606,272 B2
(45) Date of Patent: Mar. 28, 2017

(54) TRANSPARENT ELEMENT WITH DIFFUSE REFLECTION

(75) Inventor: Etienne Sandre-Chardonnal, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 178 days.

(21) Appl. No.: 14/002,563

(22) PCT Filed: Jan. 31, 2012

(86) PCT No.: PCT/FR2012/050210
§ 371 (c)(1),
(2), (4) Date: Dec. 6, 2013

(87) PCT Pub. No.: WO2012/104547
PCT Pub. Date: Aug. 9, 2012

(65) Prior Publication Data
US 2014/0104690 A1    Apr. 17, 2014

(30) Foreign Application Priority Data

Jan. 31, 2011    (FR) ...................................... 11 50699

(51) Int. Cl.
*G02B 5/02* (2006.01)
*G02B 13/20* (2006.01)
(Continued)

(52) U.S. Cl.
CPC ............ *G02B 5/0294* (2013.01); *B32B 17/10* (2013.01); *B32B 17/10036* (2013.01);
(Continued)

(58) Field of Classification Search
CPC ........ G02B 5/0242; G02B 1/118; G02B 1/11; G02B 5/02; G02B 5/0278; G02B 5/0268;
(Continued)

(56) References Cited

U.S. PATENT DOCUMENTS

| 3,661,686 A | 5/1972 | Armstrong |
| 2003/0161997 A1* | 8/2003 | Moran ...................... B32B 3/30 |
| | | 428/172 |

(Continued)

FOREIGN PATENT DOCUMENTS

| CA | 2772129 | * | 2/2011 |
| DE | 1 130 199 | | 5/1962 |
| WO | WO 2010/084132 A1 | | 7/2010 |

OTHER PUBLICATIONS

International Search Report issued May 14, 2012 in PCT/FR2012/050210 (with English translation).

*Primary Examiner* — Scott J Sugarman
*Assistant Examiner* — Sharrief Broome
(74) *Attorney, Agent, or Firm* — Oblon, McClelland, Maier & Neustadt, L.L.P.

(57) ABSTRACT

This transparent layered element (1) has two smooth outer main surfaces (2A, 4A) and comprises:
two outer layers (2, 4), which each form one of the two outer main surfaces (2A, 4A) of the element (1) and which are constituted of dielectric materials having substantially the same refractive index (n2, n4), and
a central layer (3) inserted between the two outer layers, this central layer (3) being formed either by a single layer which is a dielectric layer having a refractive index different from that of the outer layers or a metal layer, or by a stack of layers which comprises at least one dielectric layer having a refractive index different from that of the outer layers or a metal layer.
Each contact surface ($S_0$, $S_1$) between two adjacent layers of the element (1), which are one a dielectric layer and the other a metal layer, or which are two dielectric layers having different refractive indices, is textured and parallel to the other textured contact surfaces.

22 Claims, 5 Drawing Sheets

(51) Int. Cl.
*B32B 17/10* (2006.01)
*E04B 2/88* (2006.01)

(52) U.S. Cl.
CPC .. *B32B 17/10146* (2013.01); *B32B 17/10201* (2013.01); *B32B 17/10229* (2013.01); *B32B 17/10706* (2013.01); *B32B 17/10788* (2013.01); *E04B 2/88* (2013.01); *G02B 5/0221* (2013.01); *G02B 5/0236* (2013.01); *G02B 5/0268* (2013.01); *G02B 5/0278* (2013.01); *G02B 5/0284* (2013.01); *G02B 5/0289* (2013.01); *Y10T 156/1028* (2015.01)

(58) Field of Classification Search
CPC .... G02B 5/021; G02B 5/0236; G02B 5/0221; G02B 5/0226; G02B 1/105; G02B 5/0257; G02B 5/0284; G02B 1/04; G02B 1/111; G02B 27/0018; G02B 5/0215
USPC ................. 359/599, 577, 591, 601; 313/116; 362/355
See application file for complete search history.

(56) References Cited

U.S. PATENT DOCUMENTS

2003/0228476 A1* 12/2003 Buhay ............... B32B 17/10036
428/469
2008/0014398 A1 1/2008 Tueshaus et al.

* cited by examiner

TRANSPARENT ELEMENT WITH DIFFUSE REFLECTION

The present invention relates to a transparent layered element having diffuse reflection properties.

The layered element may be rigid or flexible. It may in particular be a glazing, constituted for example based on glass or on a polymer material, capable of being used for all known applications of glazings, such as for vehicles, buildings, street furniture, interior furnishings, display screens, etc. It may also be a flexible film based on a polymer material, especially capable of being added onto a surface in order to give it diffuse reflection properties while preserving its transmission properties.

Known glazings comprise standard transparent glazings, which give rise to a specular transmission and a specular reflection of incident radiation on the glazing, and translucent glazings, which give rise to a diffuse transmission and a diffuse reflection of incident radiation on the glazing.

Usually, the reflection by a glazing is said to be diffuse when incident radiation on the glazing with a given angle of incidence is reflected by the glazing in a plurality of directions. The reflection by a glazing is said to be specular when incident radiation on the glazing with a given angle of incidence is reflected by the glazing with an angle of reflection equal to the angle of incidence. Likewise, the transmission through a glazing is said to be specular when incident radiation on the glazing with a given angle of incidence is transmitted by the glazing with an angle of transmission equal to the angle of incidence.

One drawback of standard transparent glazings is that they produce clear, mirror-like reflections, which is not desirable in certain applications. Thus, when a glazing is used for a building window or a display screen, it is preferable to limit the presence of reflections, which reduce the visibility through the glazing. Clear reflections on a glazing may also generate risks of dazzle, with consequences in terms of safety, for example when vehicle headlights are reflected in the glazed facades of buildings. This problem arises very particularly for the glazed facades of airports. Indeed, it is essential to eliminate any risk of dazzle of the pilots as they approach the terminals. Furthermore, translucent glazings, although they have the advantage of not generating clear reflections, do not however make it possible to have clear vision through the glazing.

It is these drawbacks that the invention more particularly intends to overcome by proposing a layered element that simultaneously makes it possible to have a clear vision through the element, to limit mirror-like reflections on the element, and to promote diffuse reflections on the element.

For this purpose, one subject of the invention is a transparent layered element having two smooth outer main surfaces, characterized in that it comprises:

two outer layers, which each form one of the two outer main surfaces of the layered element and which are constituted of dielectric materials having substantially the same refractive index, and a central layer inserted between the outer layers, this central layer being formed either by a single layer which is a dielectric layer having a refractive index different from that of the outer layers or a metal layer, or by a stack of layers which comprises at least one dielectric layer having a refractive index different from that of the outer layers or a metal layer, where each contact surface between two adjacent layers of the layered element which are one a dielectric layer and the other a metal layer, or which are two dielectric layers having different refractive indices, is textured and parallel to the other textured contact surfaces between two adjacent layers which are one a dielectric layer and the other a metal layer or which are two dielectric layers having different refractive indices.

Within the context of the invention, a difference is made between metal layers, on the one hand, for which the value of the refractive index is not important, and dielectric layers, on the other hand, for which the difference in the refractive index relative to that of the outer layers must be considered. The expression "dielectric material or layer" is understood to mean a material or layer of low electrical conductivity, below 100 S/m.

Each outer layer of the layered element may be formed by a stack of layers, as long as the various constituent layers of the outer layer are constituted of dielectric materials that all have substantially the same refractive index.

Within the meaning of the invention, two dielectric materials have substantially the same refractive index, or their refractive indices are substantially equal, when the absolute value of the difference between their refractive indices at 550 nm is less than or equal to 0.15. Preferably, the absolute value of the difference in refractive index at 550 nm between the constituent materials of the two outer layers of the layered element is less than 0.05, more preferably less than 0.015.

Within the meaning of the invention, two dielectric layers have different refractive indices when the absolute value of the difference between their refractive indices at 550 nm is strictly greater than 0.15.

Within the meaning of the invention, the contact surface between two adjacent layers is the interface between the two adjacent layers.

Within the context of the invention, the following definitions are used:

A transparent element is an element through which there is transmission of radiation at least in the wavelength ranges of use for the targeted application of the element. By way of example, when the element is used as building or vehicle glazing, it is transparent at least in the visible wavelength range.

A smooth surface is a surface for which the surface irregularities have dimensions smaller than the wavelength of the incident radiation on the surface, so that the radiation is not deflected by these surface irregularities. The incident radiation is then transmitted and reflected in a specular manner by the surface.

A textured surface is a surface for which the surface properties vary on a scale larger than the wavelength of the incident radiation on the surface. The incident radiation is then transmitted and reflected in a diffuse manner by the surface.

Thanks to the invention, a specular transmission and a diffuse reflection of incident radiation on the layered element are obtained. The specular transmission guarantees a clear vision through the layered element. The diffuse reflection makes it possible to avoid clear reflections on the layered element and the risks of dazzle.

The diffuse reflection on the layered element is due to the fact that each contact surface between two adjacent layers which are one a dielectric layer and the other a metal layer, or which are two dielectric layers having different refractive indices, is textured. Thus, when an incident radiation on the layered element reaches such a contact surface, it is reflected by the metal layer or on account of the difference in refractive index between the two dielectric layers and, as the contact surface is textured, the reflection is diffuse.

The specular transmission is due to the fact that the two outer layers of the layered element have smooth outer main surfaces and are constituted of materials that have substantially the same refractive index, and to the fact that each textured contact surface between two adjacent layers of the layered element which are one a dielectric layer and the other a metal layer, or which are two dielectric layers having different refractive indices, is parallel to the other textured contact surfaces between two adjacent layers which are one a dielectric layer and the other a metal layer or which are two dielectric layers having different refractive indices.

The smooth outer surfaces of the layered element enable a specular transmission of radiation at each air/outer layer interface, that is to say enable radiation to enter from the air into an outer layer, or radiation to exit from an outer layer into the air, without modification of the direction of the radiation.

The parallelism of the textured contact surfaces means that the or each constituent layer of the central layer which is a dielectric layer having a refractive index different from that of the outer layers, or which is a metal layer, has a uniform thickness perpendicular to the contact surfaces of the central layer with the outer layers. This uniformity of thickness may be global over the entire extent of the texture, or local over sections of the texture. In particular, when the texture has slope variations, the thickness between two consecutive textured contact surfaces may change, by section, as a function of the slope of the texture, the textured contact surfaces however always remaining parallel to one another. This case occurs in particular for a layer deposited by sputtering, where the thickness of the layer is proportionally smaller as the slope of the texture increases. Thus, locally, on each section of texture having a given slope, the thickness of the layer remains constant, but the thickness of the layer is different between a first section of texture having a first slope and a second section of texture having a second slope different from the first slope.

Advantageously, in order to obtain the parallelism of the textured contact surfaces within the layered element, the or each constituent layer of the central layer is a layer deposited by sputtering. Indeed, sputtering, in particular magnetron sputtering, guarantees that the surfaces delimiting the layer are parallel to one another, which is not the case for other deposition techniques such as evaporation or chemical vapor deposition (CVD), or else the sol-gel process. Still, the parallelism of the textured contact surfaces within the layered element is essential for obtaining a specular transmission through the element.

Incident radiation on a first outer layer of the layered element passes through this first outer layer without modification of its direction. On account of the difference in nature, dielectric or metal, or of the difference in refractive index between the first outer layer and at least one layer of the central layer, the radiation is then refracted in the central layer. As, on the one hand, the textured contact surfaces between two adjacent layers of the layered element which are one a dielectric layer and the other a metal layer, or which are two dielectric layers having different refractive indices, are all parallel to one another and, on the other hand, the second outer layer has substantially the same refractive index as the first outer layer, the angle of refraction of the radiation in the second outer layer starting from the central layer is equal to the angle of incidence of the radiation on the central layer starting from the first outer layer, in accordance with the Snell-Descartes law for refraction.

The radiation therefore emerges from the second outer layer of the layered element along a direction which is the same as its direction of incidence on the first outer layer of the element. The transmission of the radiation by the layered element is thus specular.

According to one aspect of the invention, the diffuse reflection properties of the layered element are taken advantage of in order to reflect a large part of the radiation, in a plurality of directions, on the side on which radiation is incident. This high diffuse reflection is obtained while at the same time having a clear vision through the layered element, that is to say without the layered element being translucent, owing to the specular transmission properties of the layered element. Such a transparent layered element with high diffuse reflection finds an application, for example, for display screens or projection screens.

In particular, such a layered element with high diffuse reflection may be used in a head-up display (HUD) system. In a known manner, HUD systems, which are used in particular in airplane cockpits, trains, but also today in the motor vehicles of private individuals (cars, trucks, etc.), make it possible to display information projected onto a glazing, in general the windshield of the vehicle, which is reflected toward the driver or observer. These systems make it possible to inform the driver of the vehicle without the latter having to look away from the forward field of vision of the vehicle, which makes it possible to greatly increase safety. The driver perceives a virtual image which is located at a certain distance behind the glazing.

According to one aspect of the invention, the layered element is integrated into an HUD system as a glazing, onto which the information is projected. According to another aspect of the invention, the layered element is a flexible film added onto a main surface of a glazing of an HUD system, especially a windshield, the information being projected onto the glazing on the side of the flexible film. In these two cases, a high diffuse reflection takes place on the first textured contact surface encountered by the radiation in the layered element, which enables good visualization of the virtual image, while the specular transmission through the glazing is preserved, which guarantees clear vision through the glazing.

It is noted that, in the HUD systems of the prior art, the virtual image is obtained by projecting information onto a glazing (especially a windshield) that has a laminated structured formed of two sheets of glass and of one plastic interlayer. One drawback of these existing systems is that the driver then observes a double image: a first image reflected by the surface of the glazing oriented towards the inside of the passenger compartment and a second image by reflection of the outer surface of the glazing, these two images being slightly offset relative to one another. This off-setting may disrupt the viewing of the information.

The invention makes it possible to overcome this problem. Indeed, when the layered element is integrated into an HUD system, as glazing or as flexible film added onto the main surface of the glazing that receives the radiation from the source of projection, the diffuse reflection on the first textured contact surface encountered by the radiation in the layered element may be significantly higher than the reflection on the outer surfaces in contact with the air. Thus, the double reflection is limited by promoting the reflection on the first textured contact surface of the layered element.

According to one advantageous feature, the absolute value of the difference in refractive index at 550 nm between, on the one hand, the outer layers and, on the other hand, at least one dielectric layer of the central layer is greater than or equal to 0.3, preferably greater than or equal to 0.5, more preferably greater than or equal to 0.8. This relatively large difference in refractive index occurs at at least one textured contact surface within the layered element. This makes it possible to promote the reflection of radiation on this textured contact surface, that is to say a diffuse reflection of the radiation by the layered element.

According to one aspect of the invention, at least one of the two outer layers of the layered element is a transparent substrate, of which one of the main surfaces is textured and the other main surface is smooth.

The transparent substrate may be constituted, in particular, of a transparent polymer, transparent glass or transparent ceramic. When the transparent substrate is constituted of a polymer, it may be rigid or flexible.

The texturing of one of the main surfaces of the transparent substrate may be obtained by any known texturing process, for example by embossing the surface of the substrate, which surface is heated beforehand to a temperature at which it is possible to deform it, in particular by rolling using a roll that has, at its surface, texturing complementary to the texturing to be formed on the substrate; by abrasion using abrasive particles or abrasive surfaces, in particular by sandblasting; by chemical treatment, in particular acid treatment in the case of a glass substrate; by molding, especially by injection molding in the case of a substrate made of a thermoplastic polymer; by engraving.

Examples of suitable polymers for the transparent substrate include, in particular, polyesters such as polyethylene terephthalate (PET), polybutylene terephthalate (PBT), polyethylene naphthalate (PEN); polyacrylates such as polymethyl methacrylate (PMMA); polycarbonate; polyurethane; polyamides; polyimides; fluoropolymers such as ethylene tetrafluoroethylene (ETFE), polyvinylidene fluoride (PVDF), polychlorotrifluoroethylene (PCTFE), ethylene chlorotrifluoroethylene (ECTFE), fluorinated ethylene-propylene (FEP) copolymers; photocurable and/or photopolymerizable resins, such as thiolene resins, polyurethane resins, urethane-acrylate resins, polyester-acrylate resins.

Examples of glass substrates that are already textured and that can be used directly as outer layer of the layered element include the glass substrates SATINOVO® sold by the company Saint-Gobain Glass, which have, on one of their main surfaces, a texture obtained by sandblasting or acid treatment; the glass substrates ALBARINO® S, P or G or the glass substrates MASTERGLASS® sold by the company Saint-Gobain Glass, which have, on one of their main surfaces, a texture obtained by rolling.

When each of the two outer layers of the layered element is formed by a transparent substrate of which one of the main surfaces is textured and the other main surface is smooth, the two transparent substrates have textures that are complementary with respect to one another.

In one embodiment, the central layer of the layered element is formed by a layer of dielectric material having a refractive index different from that of the outer layers, the outer layers being assembled by means of the central layer.

In another embodiment, the central layer of the layered element comprises at least one thin layer constituted of a dielectric material with a high refractive index, different from the refractive index of the outer layers, such as $Si_3N_4$, $SnO_2$, ZnO, AlN, NbO, NbN, $TiO_2$, or constituted of a dielectric material having a low refractive index, different from the refractive index of the outer layers, such as $SiO_2$, $Al_2O_3$, $MgF_2$, $AlF_3$. The central layer of the layered element may also comprise at least one thin metal layer, especially a thin layer of silver, of gold, of titanium, of niobium, of silicon, of aluminum, of nickel-chromium (NiCr) alloy, of stainless steel, or of alloys thereof. Within the meaning of the invention, a thin layer is a layer having a thickness of less than 1 micrometer.

Advantageously, the composition of the central layer of the layered element may be adjusted in order to impart supplementary properties to the layered element, for example thermal properties, of solar control and/or low emissivity type. Thus, in one embodiment, the central layer of the layered element is a transparent stack of thin layers comprising an alternation of "n" metal functional layers, especially of functional layers based on silver or on a metal alloy containing silver, and of "(n+1)" antireflection coatings, with $n \geq 1$, where each metal functional layer is deposited between two antireflection coatings.

As is known, such a stack having a functional metal layer has reflection properties in the solar radiation range and/or in the long wavelength infrared radiation range. In such a stack, the functional metal layer or layers essentially determine the thermal performances, while the antireflection coatings which surround them act interferentially on the optical appearance. Indeed, although the metal functional layers make it possible to obtain the desired thermal performances, even at a small geometric thickness, of the order of 10 nm for each functional metal layer, they strongly oppose however the passage of radiation in the visible wavelength range. Therefore, antireflection coatings on both sides of each functional metal layer are necessary in order to ensure good light transmission in the visible range. In practice, it is the overall stack of the central layer, comprising the thin metal layers and the antireflection coatings, which is optimized optically. Advantageously, the optical optimization may be carried out on the overall stack of the layered element, that is to say including the outer layers positioned on both sides of the central layer.

The layered element obtained then combines optical properties, namely properties of specular transmission and diffuse reflection of incident radiation on the layered element, and thermal properties, namely solar-control and/or low-emissivity properties. Such a layered element may be used for solar protection and/or thermal insulation glazings of buildings or vehicles.

According to one aspect of the invention, the texture of each contact surface between two adjacent layers of the layered element which are one a dielectric layer and the other a metal layer, or which are two dielectric layers having different refractive indices, is formed by a plurality of features that are recessed or protruding relative to a general plane of the contact surface. Preferably, the mean height of the features of each contact surface between two adjacent layers of the layered element which are one a dielectric layer and the other a metal layer, or which are two dielectric layers having different refractive indices, is between one micrometer and one millimeter. Within the meaning of the invention, the mean height of the features of the contact surface is defined as the arithmetic mean of the distances $y_i$ in absolute values taken between the peak and the general plane of the contact surface for each feature of the contact surface, equal to $$\frac{1}{n}\sum_{i=1}^{n} |y_i|.$$

The features of the texture of each contact surface between two adjacent layers of the layered element which are one a dielectric layer and the other a metal layer, or which are two dielectric layers having different refractive indices, may be distributed randomly over the contact surface. As a variant, the features of the texture of each contact surface between two adjacent layers of the layered element which are one a dielectric layer and the other a metal layer, or which are two dielectric layers having different refractive indices, may be distributed periodically over the contact surface. These features may be, in particular, cones, pyramids, grooves, ribs, wavelets.

According to one aspect of the invention, for each layer of the central layer which is surrounded by layers having a nature, dielectric or metal, different from its own or refractive indices different from its own, the thickness of this layer, taken perpendicular to its contact surfaces with the adjacent layers, is small relative to the mean height of the features of each of its contact surfaces with the adjacent layers. Such a small thickness makes it possible to increase the probability that the inlet interface of radiation into this layer and the outlet interface of radiation out of this layer are parallel, and therefore to increase the percentage of specular transmission of the radiation through the layered element. Advantageously, the thickness of each layer of the central layer which is inserted between two layers having a nature, dielectric or metal, different from its own or having refractive indices different from its own, where this thickness is taken perpendicular to its contact surfaces with the adjacent layers, is less than $\frac{1}{4}$ of the mean height of the features of each of its contact surfaces with the adjacent layers.

Advantageously, the layered element comprises, on at least one of its smooth outer main surfaces, an antireflection coating at the interface between the air and the constituent material of the outer layer forming this outer main surface. Owing to the presence of this antireflection coating, incident radiation on the layered element on the side of this outer main surface is reflected in a favored manner at each textured contact surface rather than on the smooth outer surface of the layered element, which corresponds to a diffuse reflection mode rather than a specular reflection mode. A diffuse reflection of the radiation by the layered element is thus favored relative to a specular reflection.

The antireflection coating provided on at least one of the outer main surfaces of the layered element may be of any type that makes it possible to reduce the reflection of radiation at the interface between the air and the corresponding outer layer of the layered element. It may be, in particular, a layer having a refractive index between the refractive index of air and the refractive index of the outer layer, such as a layer deposited on the surface of the outer layer by a vacuum technique or a porous layer of sol-gel type, or else, in the case where the outer layer is made of glass, an etched out surface portion of the glass outer layer obtained by an acid treatment of "etching" type. As a variant, the antireflection coating may be formed by a stack of thin layers having alternatively lower and higher refractive indices acting as an interference filter at the interface between the air and the outer layer, or by a stack of thin layers that have a continuous or staggered gradient of refractive indices between the refractive index of air and that of the outer layer.

Advantageously, the smooth outer main surfaces of the layered element are parallel to one another. This helps to limit the light dispersion for radiation passing through the layered element, and therefore helps to improve the clarity of vision through the layered element.

In one embodiment of the invention, a first outer layer among the two outer layers of the layered element is a transparent substrate, of which one of the main surfaces is textured and the other main surface is smooth, and the central layer is formed either by a single layer, which is a dielectric layer having a refractive index different from that of the first outer layer or a metal layer, deposited in a conformal manner on the textured main surface of the first outer layer, or by a stack of layers, which comprises at least one dielectric layer having a refractive index different from that of the first outer layer or a metal layer, deposited successively in a conformal manner onto the textured main surface of the first outer layer.

The second outer layer may then comprise a layer of curable material having a refractive index essentially equal to that of the first outer layer, deposited on the textured main surface of the central layer on the opposite side from the first outer layer by being initially in a viscous state suitable for forming operations.

According to one aspect of the invention, the second outer layer is constituted by a layer deposited initially in a viscous state, in particular a layer of varnish type, which then ensures a planarization of the surface of the layered element.

According to another aspect of the invention, the second outer layer comprises the layer deposited initially in a viscous state and a counter-substrate, the layer deposited initially in a viscous state then ensuring firm attachment between the first outer layer provided with the central layer and the counter-substrate.

The layer deposited initially in a viscous state may be a layer of photocrosslinkable and/or photopolymerizable material. Preferably, this photocrosslinkable and/or photopolymerizable material is in liquid form at ambient temperature and gives, when it has been irradiated and photocrosslinked and/or photopolymerized, a transparent solid that is free of bubbles or of any other irregularity. It may be in particular a resin such as those customarily used as adhesives, glues or surface coatings. These resins are generally based on monomers/comonomers/prepolymers of epoxy, epoxy silane, acrylate, methacrylate, acrylic acid or methacrylic acid type. Mention may be made, for example, of thiolene, polyurethane, urethane-acrylate and polyester-acrylate resins. Instead of a resin, it may be a photocrosslinkable aqueous gel, such as a polyacrylamide gel. Examples of photocrosslinkable and/or photopolymerizable resins that can be used in the present invention include the products sold by the company Norland Optics under the trademark NOA® Norland Optical Adhesives, such as for example the products NOA65 and NOA75.

As a variant, the second outer layer deposited initially in a viscous state may be a layer deposited by a sol-gel process, for example a silica glass deposited by a sol-gel process. As is known, the precursors for the sol-gel deposition of a silica glass are silicon alkoxides $Si(OR)_4$, which give rise, in the presence of water, to polymerization reactions of hydrolysis-condensation type. These polymerization reactions lead to the formation of increasingly condensed species, which result in particles of colloidal silica that form sols then gels. The drying and densification of these silica gels, at a temperature of the order of a few hundreds of degrees, results in a glass having characteristics that are similar to those of a conventional glass. Due to their viscosity, the colloidal solution or the gel may be deposited easily onto the textured main surface of the central layer on the opposite side from the first outer layer, by conforming to the texture of this surface. This deposition may especially be carried out by dip coating, spin coating or blading.

According to one aspect of the invention, the second outer layer may comprise a layer based on a polymer material having a refractive index essentially equal to that of the first outer layer, positioned against the textured main surface of the central layer on the opposite side from the first outer layer and formed against this textured surface by compression and/or heating.

This layer based on a polymer material may be, in particular, a layer based on polyvinyl butyral (PVB), ethylene/vinyl acetate (EVA), polyurethane (PU), polyethylene terephthalate (PET), or polyvinyl chloride (PVC). This layer based on a polymer material may act as a lamination interlayer providing a bond with a transparent substrate having a refractive index substantially equal to that of the first outer layer also belonging to the second outer layer.

The layered element may be a rigid glazing. As a variant, it may be a flexible film. Such a flexible film is advantageously provided, on one of its main outer surfaces, with an adhesive layer covered with a protective strip intended to be removed for the adhesive bonding of the film. The layered element in the form of a flexible film is then capable of being added, via adhesive bonding, to an existing surface, for example a glazing surface, in order to give this surface diffuse reflection properties, while maintaining specular transmission properties.

Another subject of the invention is a process for manufacturing a layered element as described previously, comprising steps in which:
- as outer layers, two transparent substrates are provided that are constituted of dielectric materials having substantially the same refractive index, where each transparent substrate has one of its main surfaces which is textured and its other main surface which is smooth, the textures of the two transparent substrates being complementary to other another;
- a central layer, comprising at least one dielectric layer having a refractive index different from that of the outer layers or a metal layer, is sandwiched between the textured main surfaces of the two transparent substrates which are positioned opposite one another so that their textures are parallel to one another.

Another process for manufacturing a layered element as described previously comprises steps in which:
- as the first outer layer, a transparent substrate is provided, of which one of the main surfaces is textured and the other main surface is smooth;
- a central layer is deposited on the textured main surface of the first outer layer either, when the central layer is formed by a single layer, which is a dielectric layer having a refractive index different from that of the first outer layer or a metal layer, by depositing the central layer in a conformal manner on said textured main surface, or, when the central layer is formed by a stack of layers comprising at least one dielectric layer having a refractive index different from that of the first outer layer or a metal layer, by depositing the layers of the central layer successively in a conformal manner on said textured main surface;
- the second outer layer is formed on the textured main surface of the central layer on the opposite side from the first outer layer, where the first outer layer and the second outer layer are constituted of dielectric materials having substantially the same refractive index.

According to one advantageous feature, the deposition of the central layer in a conformal manner, or of the layers of the central layer successively in a conformal manner, onto the textured main surface of the first outer layer is carried out by sputtering, in particular by magnetron sputtering.

According to an aspect of the invention, the second outer layer is formed by depositing, on the textured main surface of the central layer on the opposite side from the first outer layer, a layer that has substantially the same refractive index as the first outer layer and that is initially in a viscous state suitable for forming operations. The second outer layer may thus be formed, for example, by a process comprising the deposition of a layer of photocrosslinkable and/or photopolymerizable material initially in fluid form then the irradiation of this layer, or by a sol-gel process.

According to another aspect of the invention, the second outer layer is formed by positioning, against the textured main surface of the central layer on the opposite side from the first outer layer, a layer based on a polymer material having substantially the same refractive index as the first outer layer, then by conforming this layer based on a polymer material against the textured main surface of the central layer by compression and/or heating at least at the glass transition temperature of the polymer material.

Another subject of the invention is a building facade, especially an airport terminal facade, comprising at least one layered element as described previously.

Another subject of the invention is a display screen or projection screen comprising a layered element as described previously. In particular, one subject of the invention is a head-up display system glazing comprising a layered element as described previously.

A final subject of the invention is the use of a layered element as described previously as all or part of a glazing for a vehicle, for a building, for street furniture, for interior furnishings, for a display screen, or for a head-up display system or projection screen.

The features and advantages of the invention will become apparent in the following description of several embodiments of a layered element, given solely by way of example and with reference to the appended drawings in which.

For clarity of the drawings, the relative thicknesses of the various layers in FIGS. 1 to 7 have not been rigorously respected. Furthermore, the possible thickness variation of the or each constituent layer of the central layer as a function of the slope of the texture has not been represented in the figures, it being understood that this possible thickness variation does not affect the parallelism of the textured contact surfaces. Indeed, for each given slope of the texture, the textured contact surfaces are parallel to one another.

Figure 1:
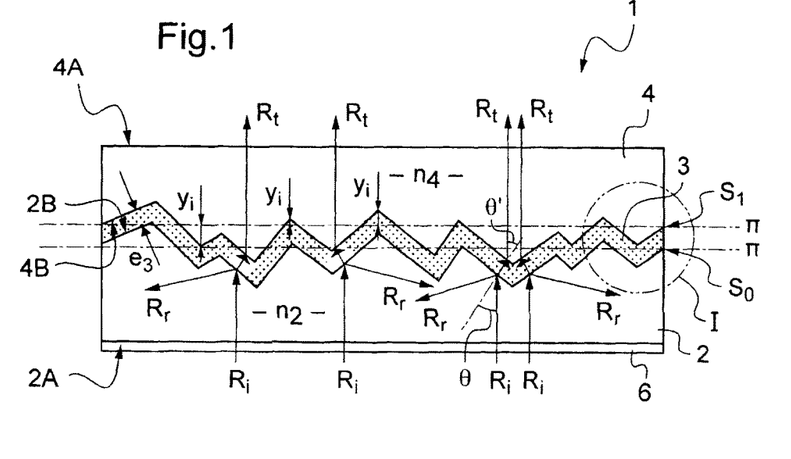
FIG. 1 is a schematic cross section of a layered element in accordance with one embodiment of the invention.

The layered element 1 represented in FIG. 1 comprises two outer layers 2 and 4, which are constituted of transparent dielectric materials having substantially the same refractive index $n_2$, $n_4$. Each outer layer 2 or has a smooth main surface, respectively 2A or 4A, directed toward the outside of the layered element, and a textured main surface, respectively 2B or 4B, directed toward the inside of the layered element.

The smooth outer surfaces 2A and 4A of the layered element 1 enable a specular transmission of radiation at each surface 2A and 4A, that is to say the inlet of radiation into an outer layer or the outlet of radiation from an outer layer without modifying the direction of the radiation.

The textures of the inner surfaces 2B and 4B are complementary to one another. As is clearly seen in FIG. 1, the textured surfaces 2B and 4B are positioned opposite one another, in a configuration where their textures are strictly parallel to one another. The layered element 1 also comprises a central layer 3, inserted in contact between the textured surfaces 2B and 4B.

Figure 2:
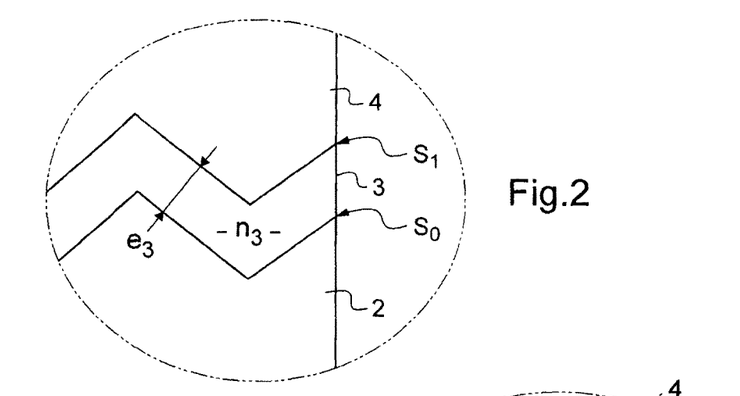
FIG. 2 is a larger scale view of the detail I of FIG. 1 for a first variant of the layered element.

In the variant shown in FIG. 2, the central layer 3 is a monolayer and is constituted of a transparent material which is either metallic or dielectric having a refractive index n3 different from that of the outer layers 2 and 4. In the variant shown in FIG. 3, the central layer 3 is formed by a transparent stack of several layers $3_1, 3_2, \ldots, 3_k$, where at least one of the layers $3_1$ to $3_k$ is either a metal layer or a dielectric layer having a refractive index different from that of the outer layers 2 and 4. Preferably, at least each of the two layers $3_1$ and $3_k$ located at the ends of the stack is a metal layer or a dielectric layer having a refractive index $n3_1$ or $n3_k$ different from that of the outer layers 2 and 4.

Figure 3:
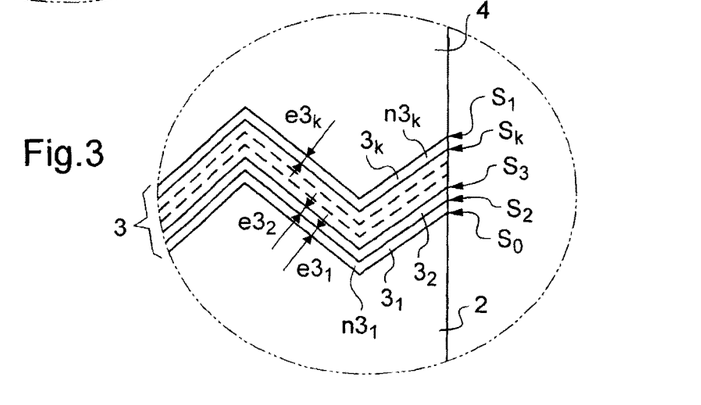
FIG. 3 is a larger scale view of the detail I of FIG. 1 for a second variant of the layered element.

In FIGS. 1 to 3, $S_0$ denotes the contact surface between the outer layer 2 and the central layer 3, and $S_1$ the contact surface between the central layer 3 and the outer layer 4. Furthermore, in FIG. 3, $S_2$ to $S_k$ successively denote the internal contact surfaces of the central layer 3, starting from the contact surface closest to the surface $S_0$.

In the variant shown in FIG. 2, on account of the arrangement of the central layer 3 in contact between the textured surfaces 2B and 4B which are parallel to one another, the contact surface $S_0$ between the outer layer 2 and the central layer 3 is textured and parallel to the contact surface $S_1$ between the central layer 3 and the outer layer 4. In other words, the central layer 3 is a textured layer having, at least locally, a uniform thickness e3 taken perpendicular to the contact surfaces $S_0$ and $S_1$.

In the variant shown in FIG. 3, each contact surface $S_2, \ldots, S_k$ between two adjacent layers of the constituent stack of the central layer 3 is textured and strictly parallel to the contact surfaces $S_0$ and $S_1$ between the outer layers 2, 4 and the central layer 3. Thus, all the contact surfaces $S_0, S_1, \ldots, S_k$ between the adjacent layers of the element 1 which are either layers of different nature, dielectric or metal, or which are dielectric layers having different refractive indices, are textured and parallel to one another. In particular, each layer $3_1, 3_2, \ldots, 3_k$ of the constituent stack of the central layer 3 has, at least locally, a uniform thickness $e3_1, e3_2, \ldots, e3_k$ taken perpendicular to the contact surfaces $S_0, S_1, \ldots, S_k$.

As shown in FIG. 1, the texture of each contact surface $S_0, S_1$ or $S_0, S_1, \ldots, S_k$ of the layered element is formed by a plurality of features that are recessed or that protrude relative to a general plane $\pi$ of the contact surface. Preferably, the mean height of the features of each textured contact surface $S_0, S_1$ or $S_0, S_1, \ldots, S_k$ is between 1 micrometer and 1 millimeter. The mean height of the features of each textured contact surface is defined as the arithmetic mean $$\frac{1}{n}\sum_{i=1}^{n} |y_i|,$$

with $y_i$ the distance taken between the peak and the plane $\pi$ for each feature of the surface, as shown schematically in FIG. 1.

According to one aspect of the invention, the thickness e3 or $e3_1, e3_2, \ldots, e3_k$ of the or each constituent layer of the central layer 3 is less than the mean height of the features of each textured contact surface $S_0, S_1$ or $S_0, S_1, \ldots, S_k$ of the layered element 1. This condition is important for increasing the probability that the inlet interface of radiation into a layer of the central layer 3 and the outlet interface of radiation out of this layer are parallel, and for thus increasing the percentage of specular transmission of the radiation through the layered element 1. For the sake of visibility of the various layers, this condition has not been strictly respected in FIGS. 1 to 7.

Preferably, the thickness e3 or $e3_1, e3_2, \ldots, e3_k$ of the or each constituent layer of the central layer 3 is less than ¼ of the mean height of the features of each textured contact surface of the layered element. In practice, when the central layer 3 is a thin layer or a stack of thin layers, the thickness e3 or $e3_1, e3_2, \ldots, e3_k$ of each layer of the central layer 3 is of the order of, or less than, 1/10 of the mean height of the features of each textured contact surface of the layered element.

FIG. 1 illustrates the path of a radiation, which is incident on the layered element 1 on the side of the outer layer 2. The incident rays $R_i$ arrive on the outer layer 2 with a given angle of incidence θ. As shown in FIG. 1, the incident rays $R_i$, when they reach the contact surface $S_0$ between the outer layer 2 and the central layer 3, are reflected either by the metal surface, or on account of the difference in refractive index at this contact surface, respectively between the outer layer 2 and the central layer 3 in the variant of FIG. 2 and between the outer layer 2 and the layer $3_1$ in the variant of FIG. 3. As the contact surface $S_0$ is textured, the reflection takes place in a plurality of directions $R_r$. The reflection of the radiation by the layered element 1 is therefore diffuse.

A portion of the incident radiation is also refracted in the central layer 3. In the variant of FIG. 2, the contact surfaces $S_0$ and $S_1$ are parallel to one another, which implies, according to the Snell-Descartes law, that n2·sin(θ)=n4·sin(θ'), where θ is the angle of incidence of the radiation on the central layer 3 starting from the outer layer 2 and θ' is the angle of refraction of the radiation in the outer layer 4 starting from the central layer 3. In the variant of FIG. 3, as the contact surfaces $S_0, S_1, \ldots, S_k$ are all parallel to one another, the relationship n2·sin(θ)=n4·sin(θ') derived from the Snell-Descartes law remains proven. Hence, in the two variants, as the refractive indices n2 and n4 of the two outer layers are substantially equal to one another, the rays $R_t$ transmitted by the layered element are transmitted with an angle of transmission θ' equal to their angle of incidence θ on the layered element. The transmission of the radiation by the layered element 1 is therefore specular.

In similar manner, in the two variants, incident radiation on the layered element 1 on the side of the outer layer 4 is reflected in a diffuse manner and transmitted in a specular manner by the layered element, for the same reasons as before.

Advantageously, the layered element 1 comprises an antireflection coating 6 on at least one of its smooth outer surfaces 2A and 4A. Preferably, an antireflection coating 6 is provided on each outer main surface of the layered element that is intended to receive radiation. In the example of FIG. 1, only the surface 2A of the outer layer 2 is provided with an antireflection coating 6, since this is the surface of the layered element that is directed toward the side of incidence of the radiation.

As mentioned previously, the antireflection coating 6, provided on the smooth surface 2A and/or 4A of the outer layer 2 or 4, may be of any type that makes it possible to reduce the reflection of radiation at the interface between the air and the outer layer. It may especially be a layer having a refractive index between the refractive index of air and the refractive index of the outer layer, a stack of thin layers acting as an interference filter, or else a stack of thin layers having a refractive index gradient.

Examples of processes for manufacturing the layered element 1 are described below, with reference to FIGS. 4 to 7.

Figure 4:
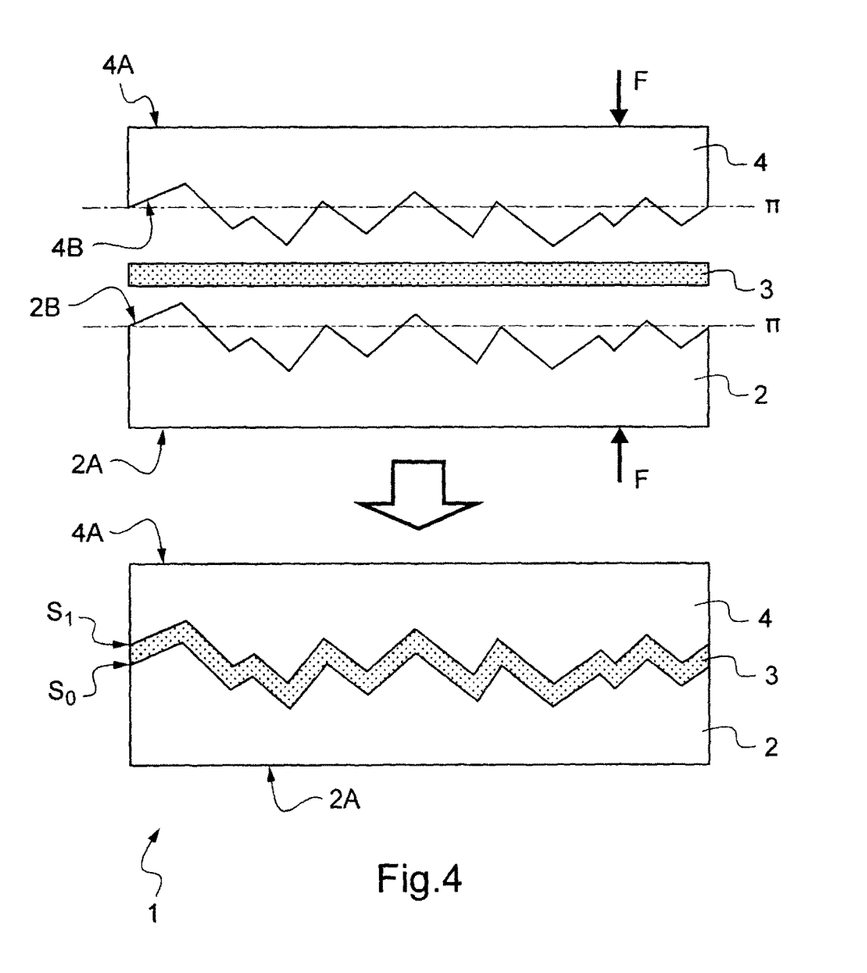
FIG. 4 is a diagram showing steps of a first process for manufacturing the layered element of FIG. 1.

In the case illustrated in FIG. 4, the outer layers 2 and 4 of the layered element 1 are formed by two rigid transparent substrates having substantially the same refractive index. Each substrate 2 or 4 has a smooth main surface 2A or 4A and a textured main surface 2B or 4B. The textures of the substrates 2 and 4 are complementary to one another, so that the substrates are capable of being nested into one another in a contiguous manner by engagement of their textures.

The substrates 2 and 4 may be, in particular, two identical substrates made of textured glass of SATINOVO®, ALBARINO® or MASTERGLASS® type. As a variant, at least one from among the two substrates 2 and 4 may be a rigid substrate based on a polymer material, for example of polymethyl methacrylate or polycarbonate type.

The central layer 3 is formed by an adhesive layer made of a transparent polymer having a refractive index different from that of substrates 2 and 4. The manufacture of the layered element involves, as shown schematically in FIG. 4, sandwiching the central layer 3 between the textured surfaces 2B and 4B of the substrates 2 and 4, these surfaces 2B and 4B having previously been positioned opposite one another in a configuration where their textures are strictly parallel to one another.

The relative position of the textured surfaces 2B and 4B with their textures parallel to one another may be obtained, in particular, by starting from a nested configuration of the substrates 2 and 4 with their textures contiguously engaged in one another, and by moving one of the substrates away relative to the other substrate via a translational movement along an axis perpendicular to a midplane of the substrate.

By way of example, when the substrates 2 and 4 are made of glass, the central layer 3 may be a layer of adhesive having a refractive index apart from that of the glass. This adhesive may initially be in a pasty state. The process for manufacturing the layered element 1 may then comprise a step in which a thickness of this adhesive in the pasty state is applied to the textured surface of one of the two substrates 2 or 4, then a step in which the thickness of adhesive is pressed between the textured surfaces 2B and 4B positioned with their textures parallel to one another.

The compression of the thickness of adhesive between the textured surfaces 2B and 4B is carried out by a relative displacement of the substrates 2 and 4 in the direction of one another, as shown by the arrows F of FIG. 4, so that the adhesive fills the recesses of the textured surfaces 2B and 4B. In a subsequent step, the adhesive solidifies between the textured surfaces 2B and 4B so that the substrates 2 and 4 are firmly attached together by means of the layer of adhesive forming the central layer 3.

In order to compress the layer of adhesive while maintaining a position of the substrates 2 and 4 in which their textured surfaces are facing one another with their textures parallel to one another, it may be advantageous to use a device comprising means for translational movement of one substrate relative to the other along an axis perpendicular to the midplane of the substrate. Such a device may especially comprise two mutually opposite plates, each intended to receive the smooth surface of one of the two substrates so that the textured surfaces of the substrates are facing one another, and a system for translation of the plates in the direction of one another.

Figure 5:
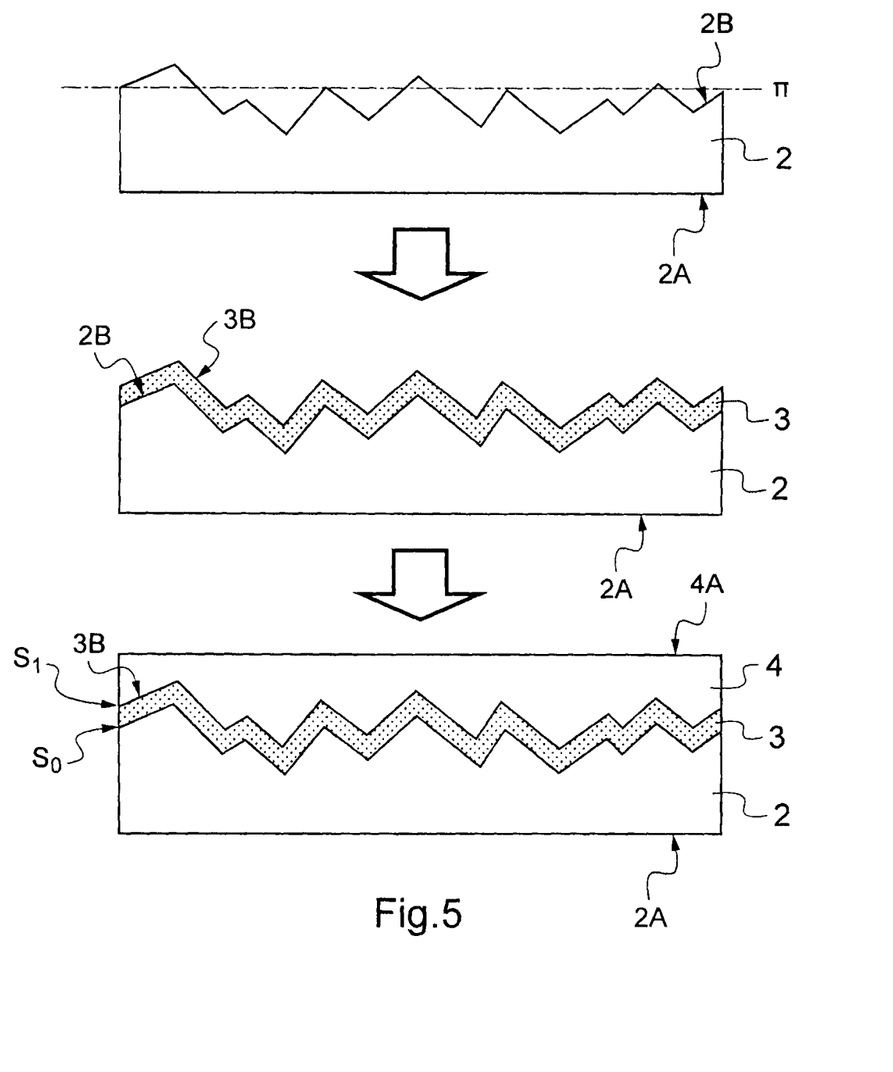
FIG. 5 is a diagram showing steps of a second process for manufacturing the layered element of FIG. 1.
Figure 6:
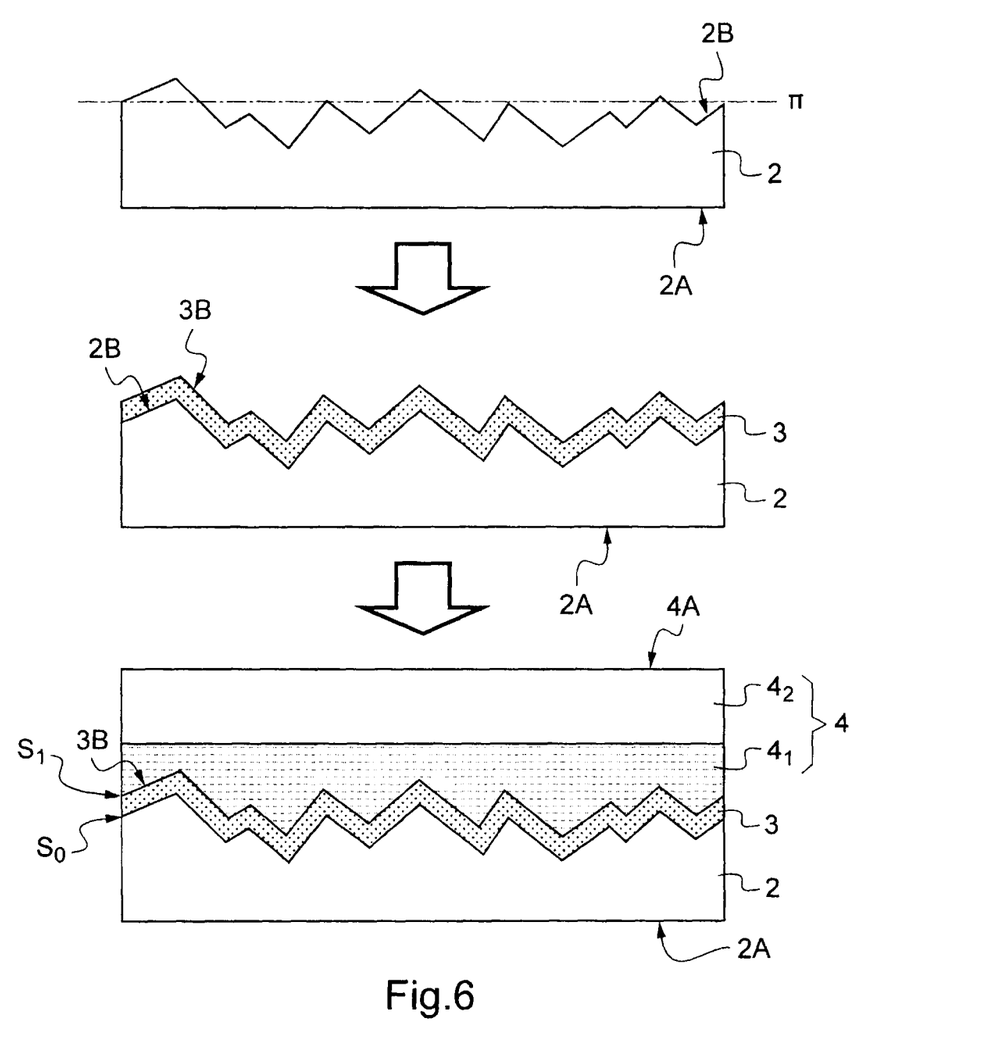
FIG. 6 is a diagram showing steps of a third process for manufacturing the layered element of FIG. 1.

The processes illustrated in FIGS. 5 and 6 differ from the process of FIG. 4 in that the central layer is deposited in a conformal manner on a textured surface 2B of a rigid or flexible transparent substrate forming the outer layer 2 of the layered element 1. The main surface 2A of this substrate on the opposite side from the textured surface 2B is smooth. This substrate 2 may be, in particular, a substrate made of textured glass of SATINOVO®, ALBARINO® or MASTERGLASS® type. As a variant, the substrate 2 may be a substrate based on a rigid or flexible polymer material.

The conformal deposition of the central layer 3, whether it is a monolayer or it is formed by a stack of several layers, is in particular carried out, under vacuum, by magnetron sputtering. This technique makes it possible to deposit, on the textured surface 2B of the substrate 2, either the single layer in a conformal manner, or the various layers of the stack successively in a conformal manner. These may in particular be dielectric thin layers, especially layers of $Si_3N_4$, $SnO_2$, ZnO, $SnZnO_x$, AlN, NbO, NbN, $TiO_2$, $SiO_2$, $Al_2O_3$, $MgF_2$, $AlF_3$, or thin metal layers, especially layers of silver, gold, titanium, niobium, silicon, aluminum, nickel-chromium (NiCr) alloy, or alloys of these metals.

In the process of FIG. 5, the second outer layer 4 of the layered element 1 is formed by covering the central layer 3 with a transparent layer having a refractive index substantially equal to that of the substrate 2, which is initially in a viscous state suitable for forming operations and which is curable. This layer, in the viscous state, follows the texture of the surface 3B of the central layer 3 on the opposite side from the substrate 2. Thus, it is guaranteed that, in the cured state of the layer 4, the contact surface $S_1$ between the central layer 3 and the outer layer 4 is well textured and parallel to the contact surface $S_0$ between the central layer 3 and the outer layer 2.

The layer 4 may be a layer of photocrosslinkable and/or photopolymerizable material, deposited on the textured surface 3B of the central layer 3 initially in liquid form then cured by irradiation, especially with UV radiation. As a variant, the layer 4 may be a layer of sol-gel type. It may be, in particular in the case where the substrate 2 is made of glass, a silica glass deposited by a sol-gel process onto the textured surface 3B of the central layer 3.

In the process of FIG. 6, the second outer layer 4 of the layered element 1 is formed by the superposition, starting from the central layer 3, of a transparent polymer lamination interlayer $4_1$ and of a transparent substrate $4_2$ both having substantially the same refractive index as the substrate 2. In the case where the substrate 2 is made of glass, the second outer layer 4 may, for example, be formed by the superposition of a lamination interlayer $4_1$ made of PVB or EVA, positioned against the textured surface 3B of the central layer 3 on the opposite side from the substrate 2, and a glass substrate $4_2$ surmounting the interlayer $4_1$.

In this case, the outer layer 4 is joined to the substrate 2, previously coated with a central layer 3, by a conventional lamination process. In this process, the polymer lamination interlayer $4_1$ and the substrate $4_2$ are positioned successively, starting from the textured main surface 3B of the central layer 3, then, compression and/or heating are applied to the laminated structure thus formed, at least at the glass transition temperature of the polymer lamination interlayer $4_1$, for example in a press or an oven. During this lamination process, the interlayer $4_1$ conforms to the texture of the textured surface 3B of the central layer 3, which guarantees that the contact surface $S_1$ between the central layer 3 and the outer layer 4 is well textured and parallel to the contact surface $S_0$ between the central layer 3 and the outer layer 2.

Figure 7:
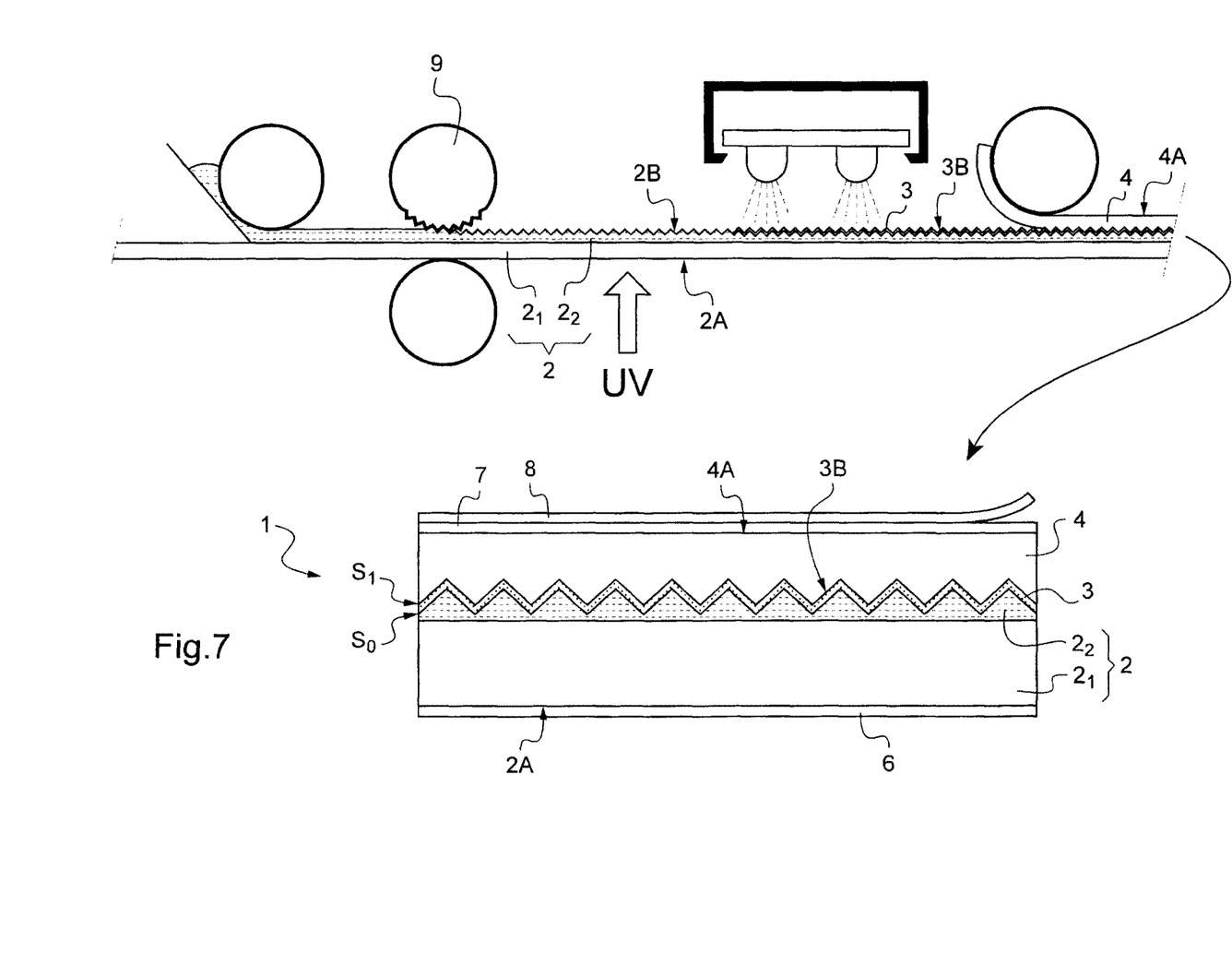
FIG. 7 is a diagram showing steps of a fourth process for manufacturing the layered element of FIG. 1.

In the process illustrated in FIG. 7, the layered element 1 is a flexible film having a total thickness of the order of 200-300 μm. The outer layer 2 of this layered element is formed by the superposition of a flexible film $2_1$ made of polymer material, the two main surfaces of which are smooth, and of a layer $2_2$ made of a material that is photocrosslinkable and/or photopolymerizable under the action of UV radiation, applied against one of the smooth main surfaces of the film $2_1$.

By way of example, the film $2_1$ is a polyethylene terephthalate (PET) film having a thickness of 100 μm, and the layer $2_2$ is a layer of UV-curable resin of KZ6661 type sold by the company JSR Corporation having a thickness of around 10 μm. The film $2_1$ and the layer $2_2$ both have substantially the same refractive index, of the order of 1.65 at 550 nm. In the cured state, the resin layer $2_2$ has a good adhesion with the PET.

The resin layer $2_2$ is applied to the film $2_1$ with a viscosity that enables texturing to be introduced on its surface 2B on the opposite side from the film $2_1$. As illustrated in FIG. 7, the texturing of the surface 2B may be carried out using a roll 9 that has, on its surface, a texturing complementary to that to be formed on the layer $2_2$. Once the texturing is formed, the superposed film $2_1$ and resin layer $2_2$ are irradiated with UV radiation, as shown by the arrow of FIG. 7, which enables the solidification of the resin layer $2_2$ with its texturing and the assembling of the film $2_1$ and the resin layer $2_2$.

A central layer 3 having a refractive index different from that of the outer layer 2 is then deposited in a conformal manner onto the textured surface 2B, by magnetron sputtering. This central layer may be a monolayer or may be formed by a stack of layers, as described previously. It may be, for example, a layer of $TiO_2$ having a thickness of the order of 50 nm and a refractive index of 2.45 at 550 nm.

A second PET film having a thickness of 100 μm is then deposited on the central layer 3 so as to form the second outer layer 4 of the layered element 1. This second outer layer 4 is conformed to the textured surface 3B of the central layer 3 on the opposite side from the outer layer 2 by compression and/or heating at the glass transition temperature of the PET.

A layer of adhesive 7, covered with a protective strip (liner) 8 intended to be removed for the bonding, may be added onto one or the other of the outer surfaces 2A and 4A of the layered element 1. The layered element 1 is thus in the form of a flexible film ready to be added, by bonding, to a surface, such as a glazing surface, in order to give this surface diffuse reflection properties. In the example of FIG. 7, the adhesive layer 7 and the protective strip 8 are added onto the outer surface 4A of the layer 4. The outer surface 2A of the layer 2, which is intended to receive incident radiation, is itself provided with an antireflection coating 6.

Particularly advantageously, as suggested in FIG. 7, the various steps of the process may be carried out continuously on one and the same production line.

The introduction of the antireflection coating(s) 6 of the layered element 1 has not been represented in FIGS. 4 to 7. It should be noted that, in each of the processes illustrated in these figures, the antireflection coating(s) 6 may be introduced onto the smooth surfaces 2A and/or 4A of the outer layers indifferently either before or after the assembly of the layered element.

The invention is not limited to the examples described and represented. In particular, when the layered element is a flexible film as in the example of FIG. 7, the thickness of each outer layer formed based on a polymer film, for example based on a PET film, may be greater than 10 μm, in particular of the order of 10 μm to 1 mm.

Furthermore, the texturing of the first outer layer 2 in the example of FIG. 7 may be obtained without use of a curable resin layer $2_2$ deposited on the polymer film $2_1$, but directly by heat embossing of the polymer film $2_1$, especially by rolling using a textured roll or by pressing using a punch.

In order to improve the cohesion of the layered element in the form of a flexible film illustrated in FIG. 7, a polymer lamination interlayer may also be inserted between the central layer 3 and the second polymer film 4, where this lamination interlayer has substantially the same refractive index as the films 2 and 4 forming the outer layers. In this case, in a manner similar to the example of FIG. 6, the second outer layer is formed by the superposition of the lamination interlayer and of the second polymer film, and is joined to the first outer layer 2 previously coated with the central layer 3 via a conventional lamination process, in which, applied to the laminated structure, are compression and/or heating at least at the glass transition temperature of the polymer lamination interlayer.

EXAMPLES

The optical properties of four examples of layered elements in accordance with the invention are given in Table 1 below. The optical properties of the layered elements given in Table 1 are the following:

$T_L$: the light transmission in the visible range in %, measured according to the standard ISO 9050:2003 (illuminant D65; 2° observer);

Haze T: the haze in transmission in %, measured using a hazemeter according to the standard ASTM D 1003 for incident radiation on the layered element on the side of the outer layer 2;

$R_L$: the total light reflection in the visible range in % for incident radiation on the layered element on the side of the outer layer 2, measured according to the standard ISO 9050:2003 (illuminant D65; 2° observer);

Haze R: the haze in reflection in % for incident radiation on the layered element on the side of the outer layer 2, defined as the ratio of the non-specular light reflection in the visible range in % over the total light reflection in the visible range in % measured with a Minolta portable machine.

TABLE 1

| | Example | | | |
|---|---|---|---|---|
| | No. 1 | No. 2 | No. 3 | No. 4 |
| Outer layer 2 | SATINOVO® 6 mm | SATINOVO® 6 mm | SATINOVO® 6 mm | SATINOVO® 6 mm |
| Central layer 3 | $TiO_2$ 55 nm | $SiO_2$ 20 nm<br>Si 10 nm<br>$SiO_2$ 20 nm | $Si_3N_4$ 50 nm<br>ZnO 6 nm<br>Ag 20 nm<br>ZnO 6 nm<br>$Si_3N_4$ 50 nm | $Si_3N_4$ 16 nm<br>ZnO 5 nm<br>NiCr 3 nm<br>Ag 8 nm<br>NiCr 1 nm<br>ZnO 6 nm<br>$Si_3N_4$ 35 nm<br>NbN 1 nm<br>$Si_3N_4$ 33 nm<br>ZnO 4 nm<br>Ag 14 nm<br>NiCr 1 nm<br>ZnO 4 nm<br>$Si_3N_4$ 34 nm<br>$SnZnO_x$ 3 nm |
| Outer layer 4 | NOA75® 100 μm<br>PLANILUX® 4 mm | NOA75® 100 μm<br>PLANILUX® 4 mm | NOA65® 100 μm<br>PLANILUX® 4 mm | EVA 0.4 mm<br>PLANILUX® 4 mm |
| Properties of the layered element | | | | |
| $T_L$ (%) | 76.7% | 54.6% | 49.6% | 35.4% |
| Haze T (%) | 2.8% | 1.9% | 4.8% | 6.0% |
| $R_L$ (%) | 14.9% | 14.3% | 18.3% | 10.0% |
| Haze R (%) | 59.0% | 60.0% | 89.9% | 49.4% |
| Color in reflection | White | Bluish | Copper | Green |

For each of the examples No. 1 to 4 given in Table 1, the substrate used as the outer layer 2 is a SATINOVO® glass from the company Saint-Gobain Glass having a thickness of 6 mm and having on one of its main surfaces a texture obtained by acid treatment. The mean height of the features of the texturing of the outer layer 2, which corresponds to the roughness Ra of the textured surface of the SATINOVO® glass, is of the order of 3 μm.

Furthermore, for each example No. 1 to 4, the constituent layer(s) of the central layer 3 were deposited by magnetron sputtering onto the textured surface 2B of the outer layer 2, with the following deposition conditions:

TABLE 2

| Layer | Target used | Deposition pressure | Gas |
|---|---|---|---|
| $TiO_2$ | $TiO_2$ | $2 \cdot 10^{-3}$ mbar | Ar/(Ar + O2) at 30% |
| $SiO_2$ | Si:Al, 98:2 wt % | $2 \cdot 10^{-3}$ mbar | Ar/(Ar + O2) at 50% |
| Si | Si | $5 \cdot 10^{-3}$ mbar | Ar at 100% |
| $Si_3N_4$ | Si:Al, 92:8 wt % | $2 \cdot 10^{-3}$ mbar | Ar/(Ar + N2) at 30% |
| ZnO | Si:Al, 98:2 wt % | $2 \cdot 10^{-3}$ mbar | Ar/(Ar + O2) at 50% |
| Ag | Ag | $5 \cdot 10^{-3}$ mbar | Ar at 100% |
| NiCr | NiCr | $5 \cdot 10^{-3}$ mbar | Ar at 100% |
| NbN | Nb | $2 \cdot 10^{-3}$ mbar | Ar/(Ar + N2) at 30% |
| $SnZnO_x$ | SnZn:Sb, 34:65:1 wt % | $2 \cdot 10^{-3}$ mbar | Ar/(Ar + O2) at 50% |

In examples No. 1 to 3, the outer layer 4 is formed by a layer of resin NOA75® or NOA65® from the company Norland Optics having a thickness of the order of 100 μm, combined with a PLANILUX® glass from the company Saint-Gobain Glass having a thickness of 4 mm. In each example, No. 1 to 3, the resin is deposited in the liquid state onto the textured surface 3B of the central layer 3 on the opposite side from the outer layer 2, so that it follows the texture of this surface 3B, then cured under the action of UV radiation after having been coated with the PLANILUX® glass.

In example No. 4, the outer layer 4 is formed by an EVA lamination interlayer having a thickness of 0.4 mm, combined with a PLANILUX® glass from the company Saint-Gobain Glass having a thickness of 4 mm. The EVA interlayer is positioned against the textured surface 3B of the central layer 3 on the opposite side from the outer layer 2, then covered with the PLANILUX® glass. The laminated structure obtained is compressed and passed into an oven at a temperature of 105° C., which enables the assembling of the layered element and the conformation of the EVA interlayer to the texture of the surface 3B of the central layer 3.

The results from Table 1 show that, for each of the examples No. 1 to 4, the following is obtained:

A good light transmission combined with a low haze in transmission, that is to say a good specular transmission through the layered element. Thus, in accordance with the objectives of the invention, the vision through the layered element is clear. This property is verified visually on the samples which are, for the four examples, transparent and not translucent.

A high haze in reflection, that is to say a high percentage of diffuse reflection relative to the total reflection on the layered element. In accordance with the objectives of the invention, "mirror" type reflections on the layered element are thus avoided.

The percentage of diffuse reflection relative to the total reflection on the layered element may be adjusted by playing with several parameters of the layered element. In particular, this percentage may be increased by introducing one and/or the other of the following measures:

provide an antireflection coating on the or each outer surface of the layered element which is intended to receive incident radiation, which makes it possible to limit specular reflections on this smooth outer surface and thus to favor a diffuse mode of reflection on the textured contact surfaces between the adjacent layers of the layered element, rather than a specular mode of reflection on its smooth outer surface;

increase the gap in refractive index at the contact surface between the or each outer layer of the layered element which is located on the incidence side of radiation and the central layer, and/or at each contact surface between the constituent adjacent layers of the central layer, which makes it possible to increase the reflection of radiation on these textured contact surfaces, which is a diffuse reflection.

The invention claimed is:

1. A transparent layered element, comprising:
a first outer layer comprising a dielectric material,
a second outer layer comprising a dielectric material, and
a central layer,
wherein the first and second outer layers each comprise a smooth outer main surface,
the dielectric material of the first outer layer has substantially the same refractive index as the dielectric material of the second outer layer,
the central layer is inserted between the first and second outer layers,
the central layer is a transparent stack of thin layers comprising an alternation of "n" metal functional layers and "(n+1)" antireflection coatings, with n≥1,
each metal functional layer is between two antireflection coatings, and
the transparent layered element further comprises textured contact surfaces, which are between a dielectric layer and an adjacent metal layer, or which are between two adjacent dielectric layers having different refractive indices, and
wherein each of the textured contact surfaces is textured and parallel to each of the other textured contact surfaces.

2. A transparent layered element, comprising:
a first outer layer comprising a dielectric material,
a second outer layer comprising a dielectric material, and
a central layer,
wherein the first and second outer layers each comprise a smooth outer main surface,
the dielectric material of the first outer layer has substantially the same refractive index as the dielectric material of the second outer layer,
the central layer is inserted between the first and second outer layers,
the central layer is:
a single dielectric layer having a refractive index different from that of the first and second outer layers, or
a stack of layers which comprises a dielectric layer having a refractive index different from that of the first and second outer layers,
an absolute value of a difference between the refractive index of the first and second outer layers at a wavelength of 550 nm and the refractive index of the dielectric layer of the central layer at a wavelength of 550 nm is greater than or equal to 0.3,
the transparent layered element further comprises textured contact surfaces, which are between two adjacent dielectric layers having different refractive indices,
wherein each of the textured contact surfaces is textured and parallel to each of the other textured contact surfaces, and
wherein, in the central layer, the dielectric layer has a uniform thickness.

3. A layered element as in either claim 1 or claim 2, wherein at least one of the first and second outer layers is a transparent substrate comprising a first main surface and a second main surface, the first main surface being textured and the second main surface being smooth.

4. The layered element of claim 2, wherein the first and second outer layers are attached together with the central layer.

5. A layered element as in either claim 1 or claim 2,
wherein, for each given layer of the central layer which is inserted between layers having a dielectric or metal nature different from its own or refractive indices different from its own, a thickness of such layer is less than ¼ of a mean height of features of the texture of contact surfaces of such layer with adjacent layers,
wherein the thickness of such layer is a thickness perpendicular to contact surfaces of the given layer with adjacent layers, and
wherein the mean height of the features is an arithmetic mean of absolute value distances between peaks of the contact surfaces and the general plane of the contact surfaces.

6. A layered element as in either claim 1 or claim 2, further comprising, on at least one outer main surface, an antireflection coating.

7. A layered element as in either claim 1 or claim 2, wherein the outer main surfaces of the layered element are parallel to one another.

8. The layered element of claim 2,
wherein the first outer layer is a transparent substrate comprising a textured main surface and a smooth outer main surface,
and wherein either
the central layer is a single dielectric layer having a refractive index different from that of the first outer layer, deposited in a conformal manner on the textured main surface of the first outer layer,
or
the central layer is a stack of layers which comprise a dielectric layer having a refractive index different from that of the first outer layer, deposited successively in a conformal manner onto the textured main surface of the first outer layer.

9. The layered element of claim 8,
wherein the second outer layer is deposited on a textured main surface of the central layer on an opposite side from the first outer layer by being initially in a viscous state suitable for forming operations.

10. The layered element of claim 8,
wherein the second outer layer comprises a polymer lamination interlayer positioned against a textured main surface of the central layer on an opposite side from the first outer layer.

11. A process for manufacturing the layered element of claim 2, the process comprising:
sandwiching the central layer between a textured main surface of the first outer layer and a textured main surface of the second outer layer which are opposite one another, thereby positioning the textured main surfaces parallel to one another,
wherein the first and second outer layers are each transparent substrates, and wherein textures of the textured main surfaces are complementary to one another.

12. A process for manufacturing a layered element as in either claim 1 or claim 2, the process comprising:
depositing the central layer on a textured main surface of the first outer layer by depositing the single central layer in a conformal manner on the textured main surface of the first outer layer by sputtering, or by depositing each of the layers of the multilayer central layer successively in a conformal manner on the textured main surface of the first outer layer by sputtering; and
forming the second outer layer on a textured main surface of the central layer on an opposite side from the first outer layer,
wherein the first outer layer is a transparent substrate.

13. The process of claim 12, wherein depositing the central layer comprises depositing the single central layer or the layers of the multilayer central layer by magnetron sputtering.

14. The process of claim 12,
wherein forming the second outer layer comprises depositing, on the textured main surface of the central layer on the opposite side from the first outer layer, a layer that has substantially the same refractive index as the first outer layer and that is initially in a viscous state suitable for forming operations.

15. The process of claim 12, wherein forming the second outer layer comprises:
positioning, against the textured main surface of the central layer on the opposite side from the first outer layer, a layer based on a polymer material having substantially the same refractive index as the first outer layer, then
conforming the layer based on a polymer material against the textured main surface of the central layer by compression and/or heating.

16. A building facade, comprising a layered element as in either claim 1 or claim 2.

17. A display screen, comprising a layered element as in either claim 1 or claim 2.

18. A glazing comprising a layered element as in either claim 1 or claim 2, wherein the glazing is suitable for a vehicle, for a building, for street furniture, for interior furnishings, for a display screen, or for a head-up display system.

19. A layered element of either claim 1 or claim 2, wherein each constituent layer of the central layer is a layer obtained by sputter deposition onto a textured surface.

20. The layered element of claim 1,
wherein the first outer layer is a transparent substrate comprising a textured main surface and a smooth main surface,
and wherein the layers of the central layer are deposited successively in a conformal manner onto the textured main surface of the first outer layer.

21. The layered element of claim 20,
wherein the second outer layer is deposited on a textured main surface of the central layer on an opposite side from the first outer layer by being initially in a viscous state suitable for forming operations.

22. The layered element of claim 20,
wherein the second outer layer comprises a polymer lamination interlayer positioned against a textured main surface of the central layer on an opposite side from the first outer layer.

* * * * *